July 30, 1968

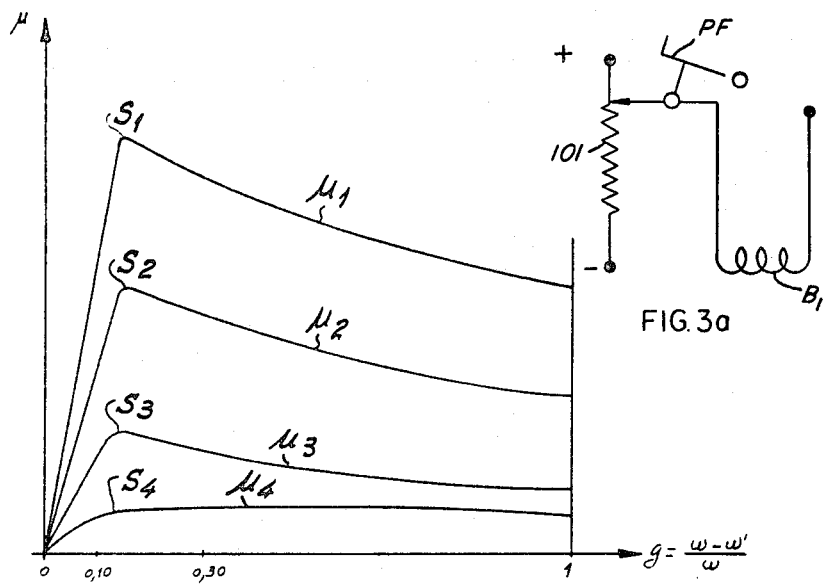
FIG. 1
FIG. 3a
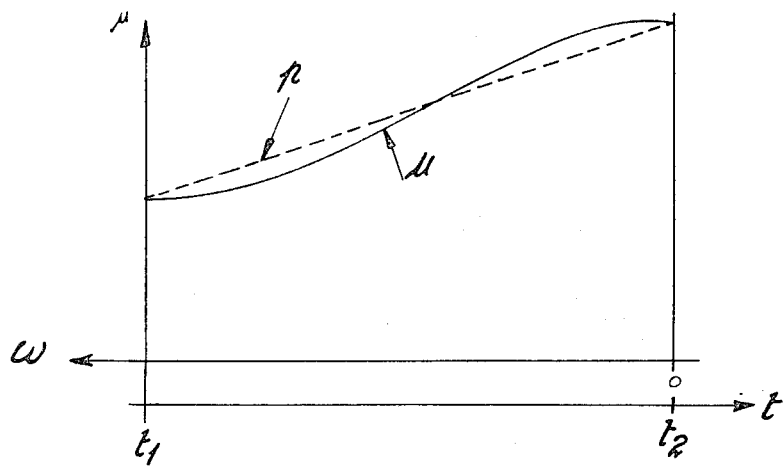
FIG. 2

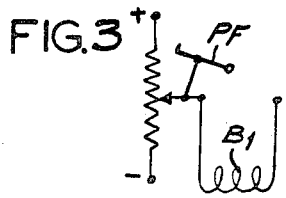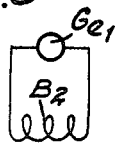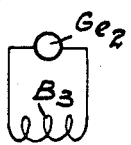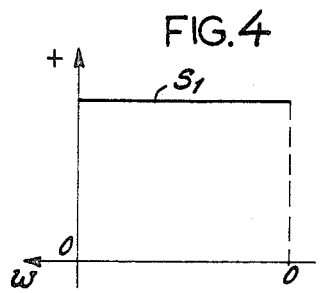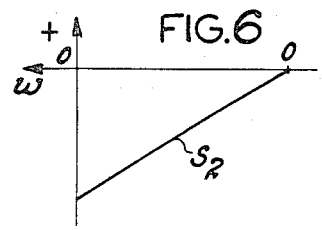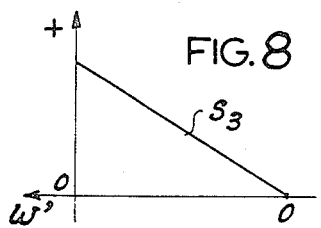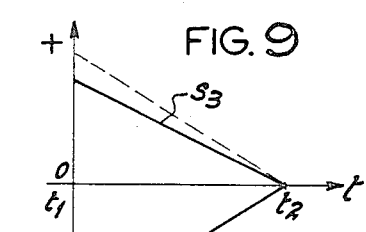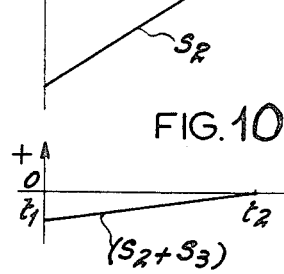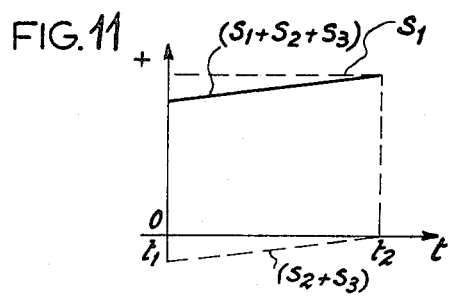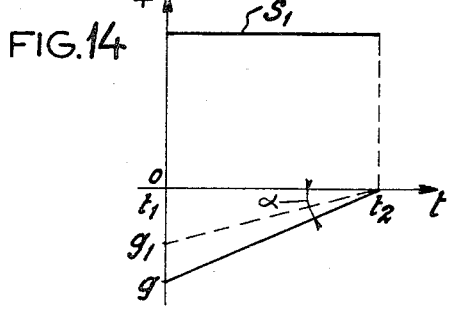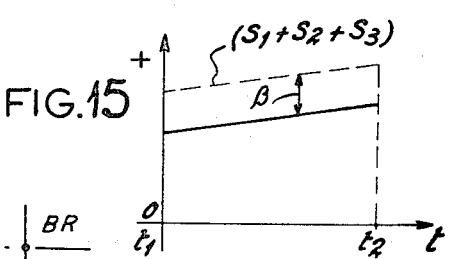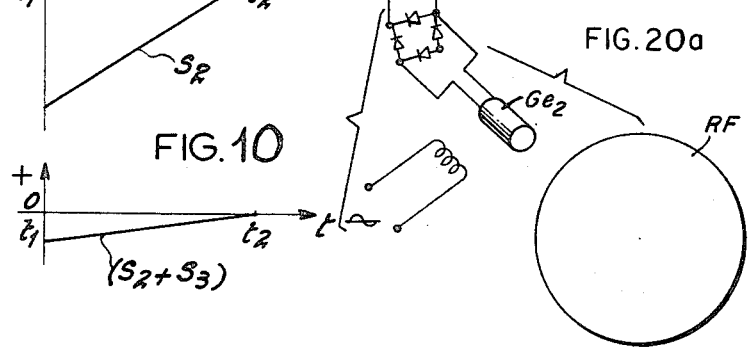

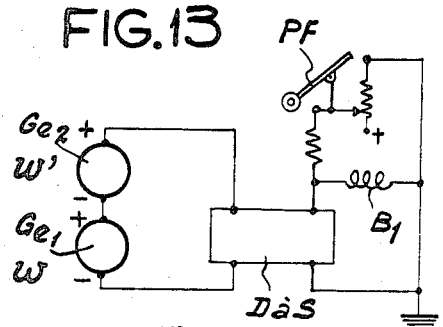
FIG.13
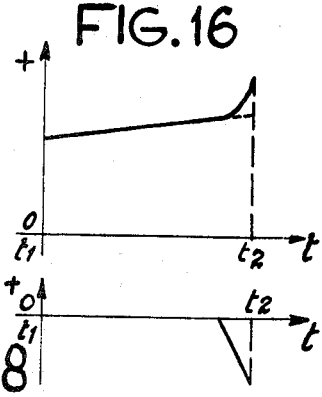
FIG.16
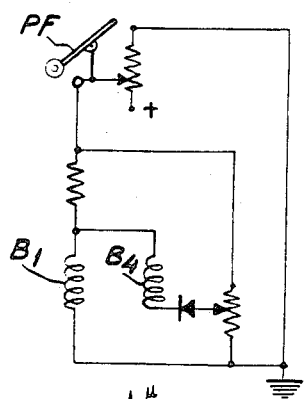
FIG.17
FIG.18
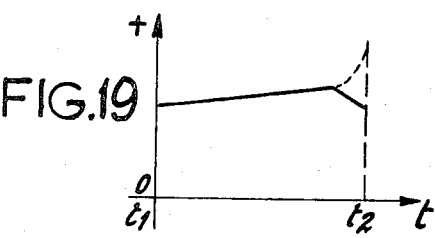
FIG.19
FIG.12
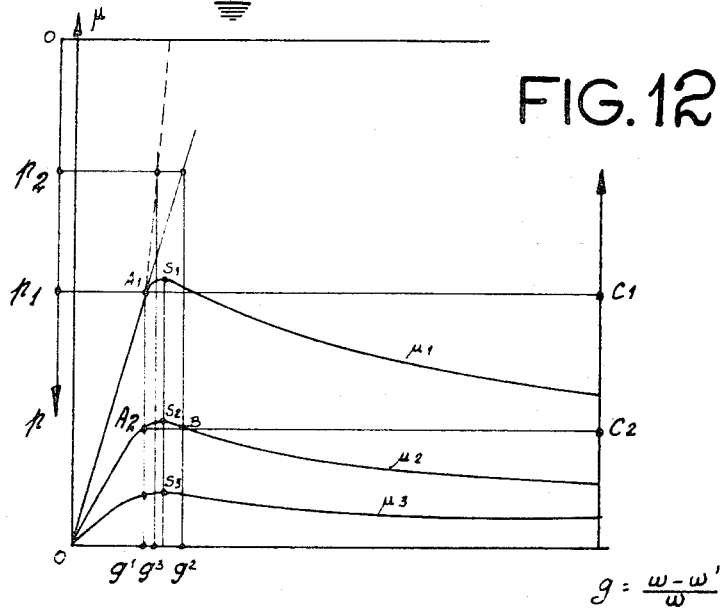
$g = \dfrac{\omega - \omega'}{\omega}$

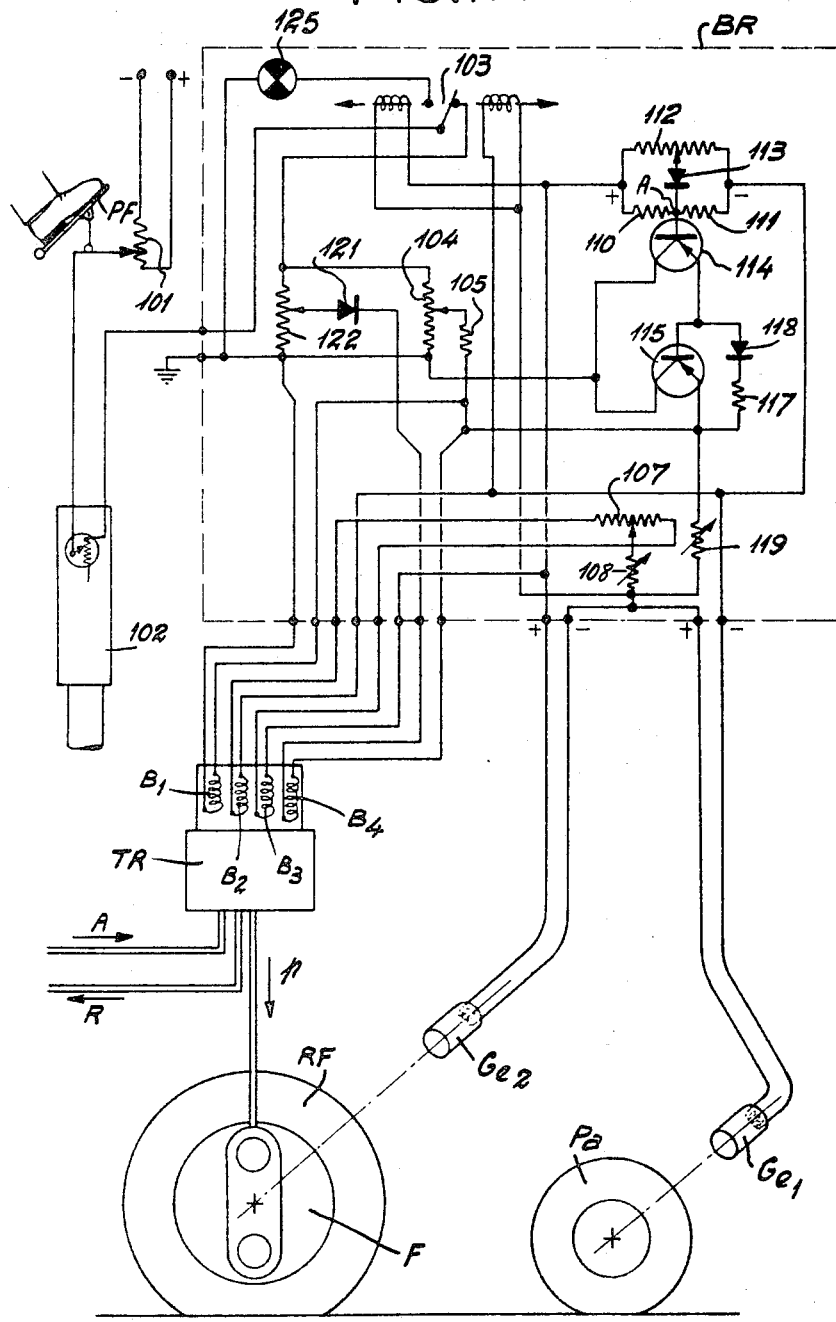

R. LUCIEN 3,394,967

METHOD AND APPARATUS FOR CONTROL OF BRAKING OF
A VEHICLE ON PNEUMATIC TIRE WHEELS

Filed May 9, 1966

United States Patent Office 3,394,967
Patented July 30, 1968

1

3,394,967
METHOD AND APPARATUS FOR CONTROL OF BRAKING OF A VEHICLE ON PNEUMATIC TIRE WHEELS
Rene Lucien, Neuilly-sur-Seine, France, assignor to Recherches Etudes Production R.E.P., Paris, France
Filed May 9, 1966, Ser. No. 549,132
Claims priority, application France, May 10, 1965, 16,500
13 Claims. (Cl. 303—21)

The present invention relates to a method of and a device for controlling the braking devices of a vehicle on pneumatic wheels, the said method and device being characterized by extensive adaptations automatically regulated by the instantaneous conditions of braking in which the vehicle is placed.

The invention will be described with reference to the accompanying drawings, given by way of example and without implied limitation. In these drawings:

FIGS. 1 and 2 show certain data concerning braking;

FIGS. 3, 5 and 7 show diagrammatically certain arrangements of the invention, which are explained in FIGS. 4, 6, 8, 9, 10 and 11;

FIG. 3a shows a modified version of the arrangement of FIG. 3;

Figure 21:
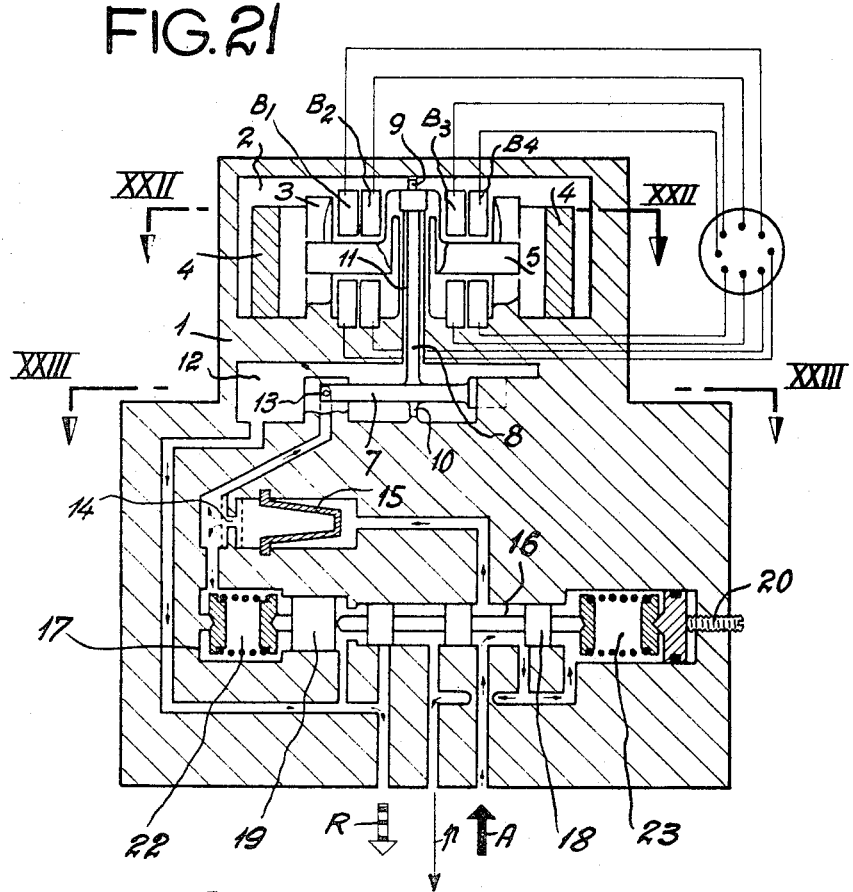
Figure 23:
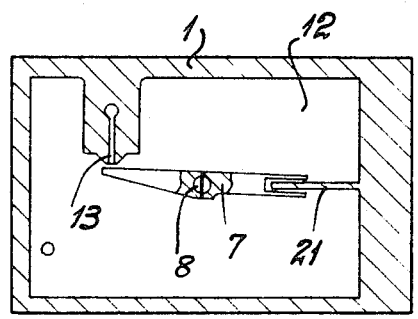
Figure 22:
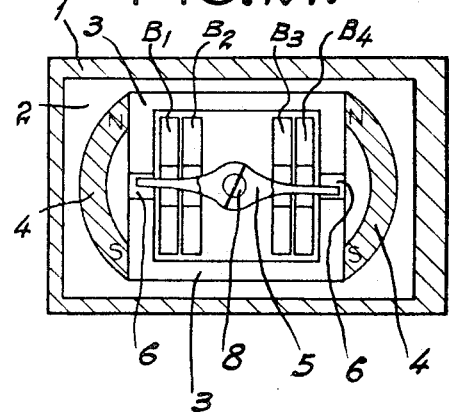

FIG. 12 relates certain data and certain parameters of the principle of the device according to the invention;

FIGS. 13 and 17 show diagrammatically certain arrangements according to the invention, these arrangements being explained in FIGS. 14, 15, 16, 18 and 19;

FIG. 20 is a general diagram of one application of the invention;

FIG. 21 is a cross-section elevation of the transducer employed in the said application of the invention, FIGS. 22 and 23 being transverse cross-sections taken along the line XXII—XXII and XXIII—XXIII of FIG. 21 and FIG. 20a shows a modified portion of FIG. 20.

It will first be recalled what really constitute these instantaneous conditions of braking, several of which come into play. If $\omega$ is the angular speed of a non-braked wheel, this angular speed is strictly proportional to the speed of the vehicle, and in order to simplify the remainder of the description, $\omega$ will be used indifferently to designate this angular speed or the speed of the vehicle; $\omega'$ will represent the angular speed of a braked wheel. The slip $g$ will be given by the ratio:

$$g = \frac{\omega - \omega'}{\omega}$$

and finally $\mu$ is the coefficient of friction of the pneumatic tire on the ground. When only the slip $g$ is to be varied, the coefficient $\mu$ varies according to one of the curves, for example the curve $\mu_1$ of FIG. 1. The coefficient $\mu$ at first increases very rapidly, passes through a maximum at $S_1$ for a value of $g$ generally slightly greater than 0.10, and then decreases more and more slowly.

It is clear that in order to obtain the most effective braking, it is desirable to operate in the immediate vicinity of the summit S of the curve, and to avoid passing beyond this point at which the instability of the braking results in the locking of the wheel ($\omega'=0$ and $g=1$).

The invention has therefore for its object a braking control such that the slip $g$ remains automatically within the zone thus determined in the vicinity of the summit S.

For different types of ground, the curve $\mu_1$ FIG. 1 is replaced by a family of similar curves $\mu_1$, $\mu_2$, $\mu_3$. It is observed from FIG. 1 that the summits $S_1$, $S_2$, $S_3$, ... of these various curves, each of which corresponds to the maximum value of the coefficient $\mu$ for the ground considered, are located in a fairly restricted zone passing from $g=0.10$ to $g=0.25$ approx.

2

In consequence, the invention has for its object a braking control such that, for every type of ground, the slip $g$ remains automatically within the zone specified above, in the vicinity of the summit S of the curve $\mu$ corresponding to the ground utilized.

When the speed of the vehicle falls, the coefficient $\mu$ increases following the curve (in full line) of FIG. 2, in which the speed $\omega$ is plotted in abscissae increasing from right to left according to the usual representation for braking (the braking times increase from left to right); the coefficient $\mu$ increases fairly slowly at high speeds and fairly substantially at low speeds. On the other hand, it is known that, in a hydraulic brake, the braking torque is an increasing linear function of the braking pressure $p$.

In consequence, the invention has for its object a braking control of this kind, in which the braking pressure $p$ decreases automatically following a pre-determined linear function of the speed $\omega$. More precisely, the braking pressure varies automatically following the straight line $p$ (in broken lines) of FIG. 2, this straight line being the closest to the curve $\mu$.

The invention has finally for its object a braking control of this kind which is as simple and as accurate as possible while making the maximum use of the normal braking members.

The principle of the braking control in accordance with the invention is based on the use of a plurality of control signals. A first control signal (FIG. 3) comes from the brake control pedal PF; the result of this in the coil B1 is a positive signal S1 (FIG. 4) corresponding to the best coefficient $\mu$ at zero speed (this assuming that the driver brakes the vehicle fully).

A second control signal (FIG. 5) comes from a generator Ge1 driven by an unbraked wheel, or from any other means of measurement of the speed of the vehicle. The result in the coil B2 is a signal S2 (FIG. 6) proportional to the speed $\omega$ and, by definition according to the invention, negative (that is to say producing in the coil B2 a flux in opposition to the flux produced by the first signal S1 in the coil B1). A third control signal (FIG. 7) comes from a generator Ge2 driven by the braked wheel; the result of this in the coil B3 is a signal S3 (FIG. 8) proportional to the speed $\omega'$ and by definition according to the invention, positive and producing in the coil B3 a flux equal but opposite to the flux produced in the coil B2 by the signal S2 when the two speeds $\omega$ and $\omega'$ are equal.

It is the algebraic sum of these three control signals, or more accurately the algebraic sum of the fluxes which they produce in the coils B1, B2, B3, which automatically determines the appropriate braking pressure in the control member (which will be described later).

If the brake pedal PF is not actuated, the first signal S1 is zero and since $\omega'=\omega$, the second and third signals S2 and S3 cancel out. As the algebraic sum of the signals is zero, the control member does not send any pressure into the brake circuit and there is no braking.

If the brake pedal PF is actuated and kept fully down, the first signal S1 is positive and constant for the whole period of braking (FIG. 4). At the first instant of braking, $\omega'=\omega$, and the second and third signals S2 and S3 are again annulled (FIGS. 6 and 8). The control member sends a braking pressure into the brake circuit; this immediately causes a slip of the braked wheel, the speed $\omega'$ of which becomes less than the speed $\omega$ of the unbraked wheel. In consequence, at any instant $t$ of the braking (FIG. 9), the third signal S3 becomes, in absolute value, smaller than the second signal S2, the algebraic sum of two signals $S2+S3$ becomes negative (FIG. 10). The algebraic sum $S1+S2+S3$, thus increases linearly when the speed $\omega$ falls (FIG. 11), and this produces, of course with a suitable choice of the operating parameters, the desired curve for the braking pressure $p$ (broken outline shown in FIG. 2).

In more detail, it is found that for a predetermined braking torque, if the coefficient $\mu$ falls slightly, the slip of the braked wheel increases. By the channel of the information coming from the braked wheel and from the unbraked wheel, the signal $(S2+S3)$ which represents the slip increases, and the resultant signal $(S1+S2+S3)$ diminishes, which causes a drop in pressure in the control member.

This pressure regulation on the ground at a high coefficient of friction, which is an optimum value, is thus such that for any speed of the vehicle there is obtained, on the one hand a maximum braking pressure corresponding to a fixed value of slip $g$ as close as possible to the summit S1 of the curve $\mu g$ (FIG. 12), at the point $A_1$ for example, and on the other hand, variations of pressure which are inversely proportional to the variations of slip.

Thus, at the point $A_1$ of FIG. 12, corresponding to ground having a coefficient $\mu_1$, there is required a braking torque $C_1$, and therefore a pressure $P_1$, in order to obtain the slip $g_1$. In the case of ground having a coefficient less than $\mu$ maximum, the control member is informed and adjusts the pressure in consequence.

According to FIG. 12, it is seen that for a ground having a coefficient $\mu_2$, less than $\mu_1$, and for the same value of slip $g_1$, the admissible braking torque will only be $C_2$, corresponding to a braking pressure $P_2$, smaller than $P_1$. If only the optimum value stated above were utilized, the slip corresponding to this pressure $P_2$ would be $g_2$ which in turn corresponds to the point B of the curve $\mu_2$. This point B is located well beyond the point $A_2$ corresponding to the fixed slip $g_1$, which is not compatible with the desired object. This optimization is therefore not sufficient for the cases of braking on ground having a low coefficient of friction.

If the coefficient of friction between tire and ground diminishes, it is therefore necessary, in order to remain short of the point $S_2$ of the curve $\mu_2$, to reduce the pressure to $P_2$, giving the admissible torque $C_2$, but for a small variation of slip, for example $g_1$—$g_3$. To do this, the control member, by the information of speeds $\omega$ for the vehicle and $\omega'$ for the braked wheel which it receives, detects the moment when the slip $g$ exceeds the fixed value $g_1$.

This detection is obtained (FIG. 13) by a threshold device D$a$S (which will be described in detail later), connected on the one hand to the sum of the voltages of the two generators Ge1 and Ge2 and on the other hand connected in parallel with the coil B1. When the slip $g$ exceeds $g_1$ (FIG. 14), the threshold device reduces the signal S1, and therefore the sum $(S1+S2+S3)$ by a quantity $\beta$ proportional to the value $\alpha$ of the slip (FIG. 15).

This system of regulation is thus not effective as long as the slip is less than the pre-determined threshold value. However, when it comes into play, the braking pressure is reduced to a considerable extent and skidding of the wheel is avoided. By reason of the reduction in pressure, as soon as the slip has again become smaller than the threshold value, the action on the circuit 1 is eliminated and the optimization by the circuits 2 and 3 starts again. If the ground has uniformly a low coefficient of friction, braking will be effected with a slip greater than the threshold slip, and it is even possible to exceed the summit S of the characteristic curve $\mu g$. However, the wheel cannot be caused to slip up to complete locking since, for a value of slip greater than about 0.30, the pressure delivered by the control member is nil.

At the end of braking, at low speeds, the generators Ge1 and Ge2 deliver low voltages with a considerable background noise. The regulation shown in FIG. 15 is in fact in agreement with the outline of FIG. 16, as the pressure rises to values higher than the theoretical values.

As shown in FIG. 17, the control member comprises a coil B4, connected between the hot point of the coil B1 on the one hand and to a point of adjustable positive voltage on the other by a diode which prevents the passage of current in the reverse direction. This coil B4 thus receives at the end of braking, a current such as that shown in FIG. 18 and the result for the pressure (FIG. 19) is an outline much closer to the theoretical curve.

By way of non-limitative example of application of the principle of braking control which has just been described, a braking control device will be described below, together with other arrangements according to the invention.

With reference to FIG. 20, the device comprises:

Detection devices;
Braking control devices.

The detection devices comprise:

A direct-current tachometer generator Ge1 which measures the speed of the vehicle $\omega$ by means of a feeler wheel P$a$ and delivers a continuous voltage proportional to that speed;

A direct-current tachometer generator Ge2, identical with that above, measuring the speed of rotation $\omega'$ of the braked wheel RF and delivering a direct-current voltage proportional to that speed.

The braking control devices comprise:

A regulation box BR;
An electro-hydraulic transducer-amplifier TR with four coils, forming the subject of the French patent filed on May 7, 1965 for "Electro-hydraulic transducer-amplifier with a plurality of control inputs," in the name of the present applicants.

This apparatus permits the calculation and delivery of a pressure by means of electric currents of low intensity. The pressure which it delivers is, in the present application, linearly proportional to the algebraic sum of the electric currents which are supplied to it.

This transducer-amplifier is shown in elevation in FIG. 21 and in cross-sections in FIGS. 22 and 23.

The transducer-amplifier TR comprises, in a single casing 1, an electro-magnetic motor 2 provided with four control coils B1, B2, B3 and B4, on a magnetic circuit 3 polarised by two permanent magnets 4, and a magnetic blade 5 oscillating in the air-gaps 6 of the said magnetic circuit 3. The magnetic blade 5 is rigidly coupled to the hydraulic blade 7 by a shaft 8; the shaft 8 is held at its two extremities by two pins 9 and 10 of small diameter and small length, which are retained in the casing 1. In addition, a torsion tube 11 plays the triple part of support, restoring spring and fluid-tight seal between the electro-magnetic motor 2 and the chamber 12 of the jet 13. The jet 13 is supplied through a diaphragm 14, a filter 15 of sintered material and a chamber 16 of the servo-distributor 17 by the supply pressure A.

The servo-distributor 17 comprises a distribution slide-valve 18 balanced by springs. The pressure obtained from the first stage is applied to the slide-valve 18 through the intermediary of a push-rod 19 having a section double that of the slide-valve. The other extremity of the slide-valve 18 is directly subjected to the utilization pressure $p$, which constitutes an internal feed-back. The state of equilibrium is obtained when the utilization pressure $p$ is twice the control pressure (inverse ratio of the sections). This system makes it possible to obtain a utilization pressure $p$ equal to the supply pressure A, the value of the control pressure supplied by the first stage not exceeding the half of the supply pressure A.

In addition, zero utilization pressure is obtained by introducing a dissymmetry into the strengths of the balancing springs of the slide-valve (adjusting screw 20) which annuls the effect of the residual pressure of the primary stage. The subsidiary function of these springs is to maintain the slide-valve in the neutral position in the absence of pressure.

The apparatus is constructed in such manner that it is not subjected to any disturbance due to longitudinal vibration. In addition, a blade shock-absorber 21 utilizing the viscosity of the service liquid reduces the resonance factor to a low value. The magnetic circuit is absolutely fluid-tight and the air-gaps cannot in any case be contaminated by particles in suspension in the fluid employed.

At rest, with no pressure supplied to the apparatus and no electric current passing through the coils, there is no torque applied on the blade-shutter assembly. This latter is in its central position.

With a constant supply pressure, but again in the absence of an electric signal, the flow under pressure through the jet 13 applies a couple on the blade-shutter 7 which tends to push it back and balances the opposing couple of the torsion tube 11. It is recalled that the residual pressure then obtaining in the chamber 22 of the push-rod 19 is balanced by a suitable adjustment of the screw 20. No communication is established towards or from the utilization.

A positive variation of the algebraic sum of the electric currents produces a magnetic couple which is added to that of the torsion tube and brings the shutter up to the jet 13. The jet-loss increases as does also the pressure in the chamber 22. This variation in pressure is proportional to the resultant current intensity and pushes back the slide-valve 18 by means of the push-rod 19 which has a cross-section twice that of the slide-valve. A flow is established from the supply to the utilization. The pressure at the utilization increases (the rapidity of this rising pressure depends especially on the capacity of the circuit), and at the same time, in the counter-reaction chamber 23, in which it acts on the section of the slide-valve. When the forces acting on this latter are equal (utilization pressure twice the control pressure existing in the chamber 22), the slide-valve returns to its central position of equilibrium; the orifices are closed and the flow-rate is zero as long as the algebraic sum of the control currents remains constant.

For a negative variation of the algebraic sum of the electric currents, the magnetic couple diminishes. The shutter moves away from the jet 13. The jet loss falls together with the pressure in the chamber 22. The slide-valve, urged by the predominant utilization pressure in the chamber 23 is displaced towards the left of the diagram, putting the orifices p and R into communication. The pressure falls at the same time in the utilization circuit and the slide-valve goes back to its central position when the equilibrium is restored and the utilization pressure is again double the control pressure. Similarly, as the algebraic sum of the currents is constant, a stray variation of the utilization pressure results in a corresponding movement of the slide-valve for the purpose of eliminating this variation and of maintaining a pressure proportional to the resultant electric signal.

Referring again to FIG. 20, there is again seen the brake pedal PF and its ancillary parts already specified. The pedal PF actuates a potentiometer 101, supplied by the internal voltage source, for example as shown, a direct-current voltage having its negative pole connected to ground and stabilized, that is to say constant in time in spite of variations in rate of flow.

The positive control voltage on the slider of the potentiometer 101 is transmitted, if so required, by a device 102. A device of this kind may be necessary for certain aircraft; it cuts-off or reduces the positive control voltage as a function of the load on the wheel. The positive control voltage passes through a relay 103 and is then applied to a potentiometer 104, the other extremity of which is grounded.

The slider of the potentiometer 104 is connected through a resistance 105 to the coil B1 of the transducer, the other terminal of which is grounded. As already explained with reference to FIG. 13, the two generators Ge1 and Ge2 are connected in series and they supply the two coils B2 and B3 of the transducer, the circuit of which is closed on a potentiometer 107 for adjusting the center point, and a resistance 108 for regulating the gain. The threshold device comprises on the one hand a bridge of two resistances 110–111 and a potentiometer 112, to one diagonal of which is applied the sum of the voltages of the two generators Ge1 and Ge2, while the other diagonal comprises a diode 113, and on the other hand two transistors 114 and 115 mounted in cascade with common collectors, the base of the input transistor 114 being connected to the point A common to the resistances 110 and 111, and to the cathode of the diode 113.

It will be understood that when everything is adjusted so that at rest a certain current passes through the diode 113, any arrival of current at the base of the input transistor 114 can only reduce the current passing through the diode 113 without increasing the voltage of the point A. There is thus obtained a considerable gain, as will be explained later.

Stability is ensured by a resistance 117 and a diode 118 mounted in series between the base and emitter of the output transistor 115. The emitter of this latter is also connected to the hot point of the coil B1 and, through a resistance 119, to the center point of the two generators Ge1 and Ge2. The coil B4 described with reference to FIG. 17, is connected between the hot point of the coil B1 and, through a diode 121, to the slider of a potentiometer 122 connected in parallel with the potentiometer 104.

The operation of the device is as follows:

At rest, the brake pedal PF is not depressed and therefore the potentiometer 101 does not take current from the direct-current supply source of the vehicle. The coil B1 of the transducer TR is not energized. As the vehicle is stationary, the generators Ge1 and Ge2 do not deliver any current, and the coils B2, B3 and B4 are not excited. The transducer thus does not deliver any pressure, and the brake F of the wheel RF is not applied.

If, while stationary, the driver depresses the brake pedal PF to the maximum extent, the potentiometer 101 takes current at the maximum positive voltage corresponding to that of the electrical system of the vehicle, and sends it, through the intermediary of the contactor 102, the relay 103, the potentiometer 104 and the resistance 105, to the coil B1.

This constant current produces a positive and constant magnetic flux in the coil B1. The optional contactor 102 is of utility if the vehicle to be braked is an aircraft, since it then prevents landing with the brakes applied. For this purpose, it is only necessary to control it, for example by the inward travel of the shock-absorbers of the landing gear, in such manner that the contact is made when the shock-absorber is depressed. As the vehicle is stationary, the generators Ge1 and Ge2 deliver no current to the coils B2 and B3. The transducer TR thus delivers to the brake F a constant pressure which is proportional to the current passing through the coil B1 (FIG. 4).

In the case of braking on ground having a high coefficient of friction, if the brake pedal PF is depressed to the maximum extent, the vehicle running at a certain speed as in the previous case, the coil B1 is supplied by a constant current which produces a positive and constant magnetic flux. The unbraked wheel Pa of the vehicle rotates at a certain speed. This speed is measured by the generator Ge1 which supplies the coil B2 through the potentiometer 107 and the resistance 108. This current, proportional to the speed of the vehicle, produces a negative magnetic flux through the coil B2 (FIG. 6). The braked wheel RF of the vehicle rotates at a certain speed. This speed is measured by the generator Ge2 which supplies the coil B3 through the potentiometer 107 and the resistance 108. This current, proportional to the speed of rotation of the braked wheel RF, produces a positive magnetic flux through the coil B3 (FIG. 8).

The purpose of the potentiometer 107 is to correct any possible unbalance between the coils B2 and B3, in such manner that for equal currents passing through these coils, there are obtained magnetic fluxes of equal value. This correction is made once and for all and it is not necessary to return to it.

The purpose of the resistance 108 is to adjust the gain of the generators. This adjustment is also made once and for all.

Thus, when the vehicle is running at a certain speed, the brake pedal PF, not yet being depressed, the wheels RF and Pa rotate at the same speed. The currents delivered by the generators Ge1 and Ge2 are equal and the magnetic fluxes of the coils B2 and B3 are equal in value at any instant but of opposite signs, cancel each other and do not produce any pressure in the transducer TR.

At the moment when the brake pedal PF is depressed, a positive magnetic flux is produced in the coil B1, and this causes the admission of a reference pressure to the brake F. This pressure corresponds to the pressure necessary to obtain the admissible braking torque for ground having the optimum coefficient of friction at zero speed. This braking will cause a slip of the wheel RF, the speed of which will become less by the value of this slip than the speed of the unbraked wheel Pa. In consequence, the current delivered by the generator Ge2 of the braked wheel will be less than the current delivered by the generator Ge1 of the unbraked wheel. In the transducer, the magnetic flux of the coil B3 will be less than the magnetic flux of the coil B2. The magnetic flux resulting from the algebraic sum of the fluxes of the coils B2 and B3 will therefore be a negative flux proportional to the value of the slip of the wheel RF (FIG. 10).

The magnetic flux resulting from the sum of the fluxes of the coils B1, B2 and B3 will result in the transducer in a law of pressure which is a function of the speed similar to the law previously described (FIG. 2).

In the case of braking on ground with a low coefficient of friction, if the brake pedal PF is depressed fully with the vehicle running at a certain speed, the process of application of pressure to the brake F, explained in the previous paragraph, takes place in the same manner: the coil B1 controls a reference pressure and the coils B2 and B3 effect a first regulation of this pressure.

It has already been explained that this regulation was not sufficient to keep the slip of the wheel RF within the range ensuring the optimum coefficient of friction between tire and ground. To do this, it is necessary to reduce the pressure controled by the coil B1 of the transducer TR. To this end, the voltages delivered by the generators Ge1 and Ge2 are added together in the resistance bridge 112.

The balance point of this resistance bridge 112 has been adjusted in such manner that a negative current passes into the center point A when the voltage delivered by the generator Ge2 of the braked wheel RF becomes less, starting from the value of slip which has been fixed, than the voltage delivered by the generator Ge1 of the unbraked wheel Pa. A diode 113 is connected in the arm of the center of the resistance bridge 112 in order to increase the gain of this regulation when the voltage of Ge2 becomes less than that of Ge1 by the threshold value of slip which has been fixed. This gain is necessary to obtain an adequate signal on the base of the input transistor 114.

Thus, when the slip of the braked wheel exceeds the optimum slip, a negative current passes into the center point A of the resistance bridge 112. This current is proportional to the slip of the wheel RF. It is applied to the base of the control transistor 114 and releases it, which enables the negative voltage of the direct-current supply of the vehicle to release in its turn the transistor 115.

This power transistor 115 then progressively reduces the current supplying the coil B1 by short-circuiting this latter downstream of the protection resistance 105. A damping of this regulation is obtained by applying to the base of the transistor 115, through the intermediary of a protection resistance 117 and a diode 118, the negative voltage passing in this transistor during its operation.

The emitter of the transistor 115 is connected to the center point of the generators by a regulating resistance 119, the current of which serves to release the transistor 115.

Thus, this regulation will only come into operation when the slip of the braked wheel RF exceeds the fixed value $g1$ (FIG. 12), and its action on the braking pressure is such that, in spite of the reduction in the coefficient of friction $\mu$ between tire and ground, the slip remains within an admissible range $g1-g3$.

At low speeds and at the end of braking, as already stated, the currents delivered by the generators become small and their background noise becomes increasingly large as compared with the output currents. This has the result of disturbing the regulation which no longer reacts correctly.

In fact, instead of obtaining a theoretical regulation such as shown in FIG. 15, there is obtained an actual regulation such as shown in FIG. 16, in which it is seen that the pressure increases the value higher than the theoretical values. In order to provide the correction necessary for this case of operation, the invention comprises an additional system of regulation.

This additional regulation only comes into operation when the voltages delivered by the generators Ge1 and Ge2 and supplying the coils B2 and B3 of the transducer TR become less than a pre-determined value, and when the slip has exceeded the value beyond which the regulation acting on the coil B1 comes into action.

When these two conditions are combined, it is found by examining FIG. 16, that the braking pressure is too high with respect to the possibilities of braking torque. In consequence, the slip of the wheel RF will increase. This increase in slip will result in a variation of voltage in the transistor 115. As a result of the adjustment of the potentiometer 104, regulated to a fixed positive voltage, when the voltage applied to the transistor 115 varies, it will become negative at a certain moment with respect to the fixed positive voltage.

This moment corresponds to the instant at which the disturbance of the regulation appears at low speeds. In order to reduce the pressure, there is then employed a fourth coil B4 on the transducer TR. This coil B4 is supplied from the direct-current source of the vehicle between the hot point of the coil B1 and, through a diode 121, the slider of a potentiometer 122 connected in parallel with the potentiometer 104.

This current produces in the coil B4 a negative magnetic flux such as shown in FIG. 18. The algebraic sum of the current passing through the four coils B1, B2, B3 and B4 then produces a resultant magnetic flux such as that shown in FIG. 19. This additional system of regulation thus makes it possible to approach as closely as possible the theoretical regulation curve shown in FIG. 15. The purpose of the diode 121 is to prevent the passage of a current which would produce a positive magnetic flux in the coil B4.

The regulation box BR shown in FIG. 20 comprises a safety device for the case where, while the braked wheel RF rotates, the unbraked wheel Pa is not yet rotating (the case of an aircraft landing when its nose-wheel is still not in contact with the runway for example, the nose-wheel serving as a feeler).

This device has the purpose of preventing, if the brake pedal PF were depressed under these conditions, the delivery of an excessive braking pressure due to the absence of negative magnetic flux in the coil B3. In consequence, the currents of the generators Ge1 and Ge2 are sent into a relay 103 with two windings. When the two generators are rotating, the relay 103 permits the supply current to pass into the transducer.

If the generator Ge1 is not rotating, whereas the generator Ge2 rotates, the current produced by this latter generates in the corresponding coil a magnetic flux which causes tripping of the relay 103 and interrupts the electric supply obtained from the brake pedal PF. This interruption is signalled to the pilot by the lighting of an indicator lamp 125 supplied by the relay 103.

The arrangement above-described in the preceding chapter operates on direct-current. It is also possible to produce a system of this kind which employs alternating current. To this end, as shown in FIG. 24a it is only necessary to replace the direct-current generators serving as detectors, for example by two-phase generators, the excitation current of which is by alternating current. There will thus be obtained an alternating current of fixed frequency, the amplitude of which will be a function of the speed of rotation of the generators.

These currents will be sent into an alternating current transducer, the coil B1 of which will also be traversed by an alternating current of the same frequency as that of the generators and being derived from the supply system on board the vehicle. The regulation will be effected by varying the amplitude of each current before sending it into a transducer coil. There may also be employed alternators and rectifiers, which brings the case back to a direct-current system.

The operation of the braking control system according to the invention has been described with the utilization of a transducer delivering a pressure for a pre-determined current. It is also possible to utilize a transducer which delivers a full braking pressure for a zero current, the pressure being reduced as and when the current increases. For this purpose, it is only necessary in the case of the direct-current arrangement for example, to modify the sign of the magnetic fluxes generated in the coils of the transducer by reversing their connections as for example shown in FIG. 3a.

What I claim is:

1. A device for the hydraulic control of the braking elements of a vehicle on pneumatic wheels, said device comprising an actuator for the braking elements of a vehicle, means including a potentiometer coupled to the actuator for producing a first electrical signal in relation to the degree of operation of the actuator, means for measuring the speed of the vehicle and delivering a second electrical signal related thereto, means for measuring the speed of the braked wheel and delivering a third electrical signal related thereto, an electrohydraulic transducer coupled to the braking elements and including three coils, the first coil receiving the first signal, the second coil producing a current flow in a direction opposite to the flow of the first coil and receiving the second signal, the third coil producing a current flow in the same direction as the flow of the first coil and receiving the third signal, said transducer sending to the braking elements a pressure proportional to the sum of said current flows.

2. A device according to claim 1 comprising an electrical threshold device establishing a threshold and receiving the second and third electrical signals, and an electrical amplifier controlled by said threshold device and progressively short-circuiting the first coil of said transducer when the difference of said second and third signals exceeds said threshold.

3. A device according to claim 1 comprising an electrical diode for delivering a fourth signal when said first signal exceeds a predetermined and adjustable value, said transducer including a fourth coil producing a current flow in a direction opposite to the first coil and receiving said fourth signal.

4. A device according to claim 1 comprising a further potentiometer responsive to the load on the wheel and inserted in series between the first said potentiometer the source of said first signal, and said first coil of said transducer for diminishing the current flow of said first coil when the weight on the wheel diminishes below a predetermined value.

5. A device as claimed in claim 1, adapted to operate on direct current.

6. A device as claimed in claim 1, adapted to operate with rectified alternating currents.

7. A device as claimed in claim 1, adapted to operate with alternating currents of the same frequency.

8. A device as claimed in claim 1, in which said transducer delivers the full braking pressure for a maximum control signal.

9. A device as claimed in claim 1, in which said transducers delivers the full braking pressure for a zero control signal.

10. A method for the hydraulic control of the braking elements of a vehicle on pneumatic wheels, said method comprising applying a braking pressure on a brake control member of a moving vehicle producing a first electrical signal related to the degree of braking pressure applied to the control member; producing a second electrical signal related to the speed of the vehicle; producing a third electrical signal related to the speed of rotation of the braked wheel; subtracting the second signal from the first signal; adding the third signal to the difference between the first and second signals, developing a hydraulic pressure proportional to the sum of the latter signals and applying said pressure to the braking elements.

11. A method according to claim 10 comprising subtracting the third signal from the second signal and comparing the difference with a predetermined value, and reducing the first signal in proportion to the excess of said difference above said predetermined value.

12. A method according to claim 10 comprising comparing the first signal with a predetermined value, and reducing the value of said sum of the three signals in proportion to the excess of said first signal above said predetermined value.

13. A method according to claim 10 comprising reducing the value of said first signal in response to reduction of the load on the braked wheel below a predetermined value.

References Cited

UNITED STATES PATENTS 3,131,975  5/1964  Smith et al. _____ 303—21

EUGENE G. BOTZ, *Primary Examiner.*